US011865981B2

(12) United States Patent
Offill (10) Patent No.: US 11,865,981 B2
(45) Date of Patent: Jan. 9, 2024

(54) WIRE LOOM SUPPORT

(71) Applicant: Thor Tech, Inc., Elkhart, IN (US)

(72) Inventor: Gary Offill, Jackson Center, OH (US)

(73) Assignee: Thor Tech, Inc., Elkhart, IN (US)

( * ) Notice: Subject to any disclaimer, the term of this patent is extended or adjusted under 35 U.S.C. 154(b) by 316 days.

(21) Appl. No.: 17/241,244

(22) Filed: Apr. 27, 2021

(65) Prior Publication Data

US 2021/0347315 A1 Nov. 11, 2021

Related U.S. Application Data

(60) Provisional application No. 63/020,234, filed on May 5, 2020.

(51) Int. Cl.
*B60R 16/02* (2006.01)
*H02G 3/04* (2006.01)
*B62D 21/02* (2006.01)
*B60P 3/32* (2006.01)

(52) U.S. Cl.
CPC ............ *B60R 16/0215* (2013.01); *B60P 3/32* (2013.01); *B62D 21/02* (2013.01); *H02G 3/0462* (2013.01)

(58) Field of Classification Search
CPC .... B62D 21/02; B62D 21/03; B60R 16/0215; B60R 16/0207; B60R 16/0222; F16L 3/24
USPC ......................................... 296/156, 164, 204
See application file for complete search history.

(56) References Cited

U.S. PATENT DOCUMENTS

| | | | | |
|---|---|---|---|---|
| 2,546,556 A | * | 3/1951 | Miller | F16L 3/24 211/60.1 |
| 3,180,597 A | * | 4/1965 | Havener | F16B 2/246 248/68.1 |
| 5,308,033 A | * | 5/1994 | Neely, Jr. | F16L 3/24 248/68.1 |
| 5,484,123 A | * | 1/1996 | Logan | B60R 16/0215 248/68.1 |
| 5,713,157 A | * | 2/1998 | van Leeuwen | F16L 3/245 52/39 |
| 6,320,134 B1 | | 11/2001 | Rehberg et al. | |

(Continued)

FOREIGN PATENT DOCUMENTS

| | | |
|---|---|---|
| CN | 203205797 U | 9/2013 |
| DE | 4029378 A1 | 3/1992 |

(Continued)

*Primary Examiner* — Amy R Weisberg
*Assistant Examiner* — Kevin P Weldon
(74) *Attorney, Agent, or Firm* — DINSMORE & SHOHL LLP (57) ABSTRACT

A recreational vehicle may comprise a vehicle body having a living space defined therein, a chassis supporting the vehicle body and having a crossmember disposed across the vehicle body, a wire loom, and a wire loom support. The wire loom support may comprise a body having a hook that fits over a first edge of the crossmember and a finger that folds over a second edge of the crossmember to support the wire loom between the wire loom support and the crossmember. A method of supporting such wire loom may comprise disposing a body of a wire loom support adjacent a crossmember, hooking a hook of the wire loom support to a first edge of the crossmember, placing a finger of a wire loom support over a second edge of the crossmember, and applying a force on the finger to bend the finger over the second edge.

19 Claims, 9 Drawing Sheets

(56) References Cited

U.S. PATENT DOCUMENTS

| | | | |
|---|---|---|---|
| 6,392,147 B1 * | 5/2002 | Hier | B60R 16/0215 174/72 A |
| 2017/0267191 A1 * | 9/2017 | Chambosse | F16B 2/08 |
| 2019/0143912 A1 * | 5/2019 | Schwiderski | F16L 3/243 248/63 |
| 2019/0322230 A1 * | 10/2019 | Ogihara | B60R 16/0215 |
| 2021/0253176 A1 * | 8/2021 | Busuioc | B62D 65/16 |
| 2022/0307529 A1 * | 9/2022 | Basavaraj Hamasagar | F16B 2/10 |

FOREIGN PATENT DOCUMENTS

| | | | | |
|---|---|---|---|---|
| DE | 102017125430 A1 * | 5/2018 | | B60R 16/0215 |
| EP | 2261353 A1 * | 8/1999 | | B60R 16/0215 |
| EP | 3406501 A1 * | 11/2018 | | B60R 16/0215 |
| FR | 2944754 A1 * | 10/2010 | | B60R 16/0215 |
| JP | H0683566 U * | 11/1994 | | |
| JP | 2005176441 A * | 6/2005 | | |
| JP | 5114124 B2 | 1/2013 | | |
| KR | 20042886 Y1 | 10/2006 | | |
| WO | WO-2009082292 A1 * | 7/2009 | | B60R 16/0215 |

* cited by examiner

WIRE LOOM SUPPORT

CROSS-REFERENCE TO RELATED APPLICATIONS

This application claims the benefit of U.S. Provisional Application Ser. No. 63/020,234 (AIR 1047 MA/40025.1417), filed May 5, 2020, the entire contents of which is incorporated herein by reference.

FIELD

The present disclosure is directed to wire loom supports and, more particularly, to wire loom supports that span a structural channel of a chassis crossmember of a recreational vehicle.

BACKGROUND

Recreational vehicles, such as motorhomes and travel trailers, have a chassis that can provide a stable platform for supporting various structures. Such structures often require wiring, and various wiring is often routed from one side of the recreational vehicle to the other side and needs to be secured to the chassis, such as to chassis crossmembers. A chassis crossmember is a structural chassis component that runs transverse to the main structure of a motor vehicle. In the automotive industry, the term "chassis crossmember" or "crossmember" typically refers to a component, usually formed from steel, which is affixed across the underside of a motor vehicle in order to structurally support vehicle components, such as an internal combustion engine and/or a transmission and to tie together longitudinal chassis members that form the main structure of the chassis. Crossmembers can be used to provide support for components that span the width of a vehicle, such as a wire loom. For example, in one implementation, one or more holes can be drilled directly into the crossmember in order to anchor a wire loom within the C-channel of the crossmember. The present inventors have recognized, however, that this implementation is time consuming and labor intensive, and requires the crossmember to be structurally altered.

SUMMARY

The present disclosure is directed to wire loom supports that span a structural channel of a chassis crossmember of a recreational vehicle. While the wire loom supports disclosed herein may be incorporated in any type of vehicle, it is contemplated that the wire loom supports of the present disclosure may, more specifically, be used in motorhomes, touring coaches, travel trailers, and other types of recreational vehicles. For example, and not by way of limitation, specific models of vehicles in which the wire loom support may be incorporated include the Interstate Nineteen Touring Coach offered by Airstream, Inc., and the Atlas™ Touring Coach offered by Airstream, Inc.

In accordance with one embodiment of the present disclosure, a recreational vehicle may comprise a vehicle body having a living space defined therein, a chassis supporting the vehicle body and having a crossmember disposed across the vehicle body, a wire loom, and a wire loom support. The wire loom support may comprise a body having a hook that fits over a first edge of the crossmember and a finger that folds over a second edge of the crossmember to support the wire loom between the wire loom support and the crossmember.

In accordance with another embodiment of the present disclosure, a method of supporting a wire loom of a recreational vehicle having a living space defined therein may comprise disposing a body of a wire loom support adjacent a crossmember that is disposed across an underside of a vehicle body of the recreational vehicle, hooking a hook of the wire loom support to a first edge of the crossmember with the wire loom body disposed between the wire loom support and the crossmember, placing a finger of a wire loom support over a second edge of the crossmember, and applying a force on the finger to bend the finger over the second edge, thereby securing the wire loom support to the crossmember and supporting the wire loom between the wire loom support and the crossmember.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

This disclosure contemplates a wire loom support that provides an anchor point to secure a wire loom within a C-channel of a crossmember, without having to drill holes into the crossmember itself.

Figure 1:
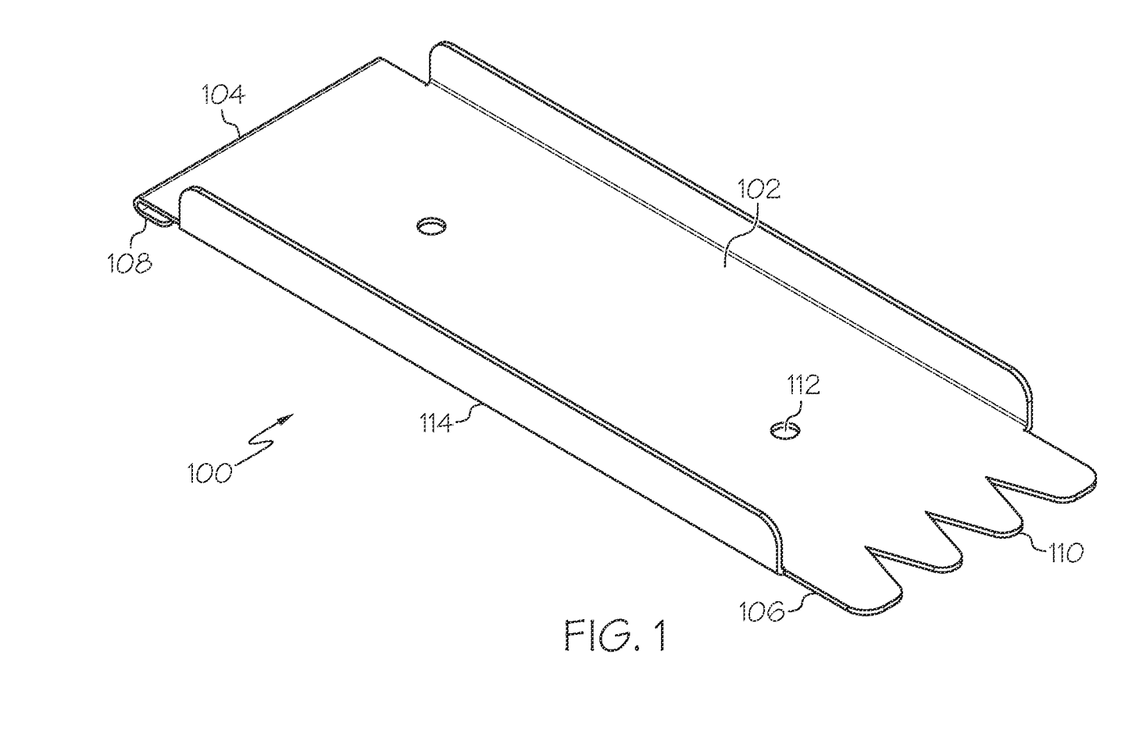
FIG. 1 schematically depicts a wire loom support, according to one or more embodiments shown and described in this disclosure.

FIG. 1 illustrates a wire loom support 100 that includes a body 102 having a hooked end 104 and a crimping end 106. The hooked end 104 includes a hook 108 that is configured to be affixed to a first edge 202 of a chassis crossmember 200 (e.g., a crossmember), which is described in further detail below, with reference to FIGS. 5-9. The hooked end 104 may be generally U-shaped in cross section, with the distal portion of the hook 108 extending back generally parallel to the hooked end of the body, so as to form an inner area to receive the first end 202 of the chassis crossmember 200. The crimping end 106 includes one or more fingers 110 that may be folded over a second edge 206, opposite the first edge in a crosswise direction, of the chassis crossmember 200. For example, fingers 110 may include four fingers to have a better fit to the second edge 206, but can be modified for better fit.

Figure 2:
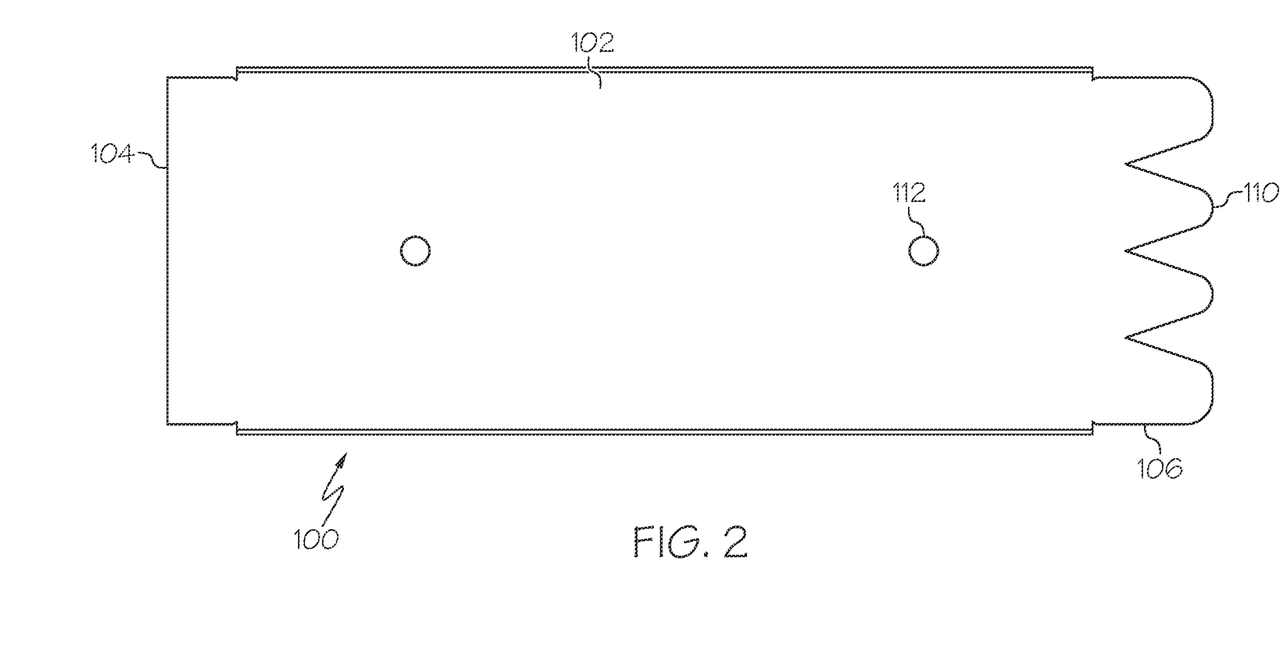
FIG. 2 schematically depicts a top view of a wire loom support, according to one or more embodiments shown and described in this disclosure.
Figure 7:
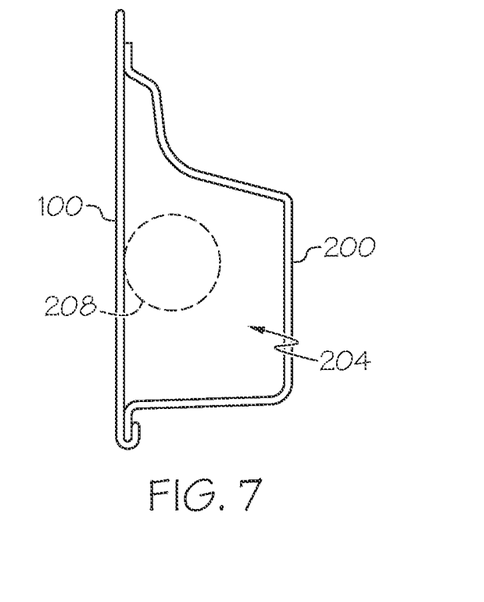
FIG. 7 schematically depicts a cross sectional view of a wire loom placed in a space between a wire loom support and a crossmember, according to one or more embodiments shown and described in this disclosure.
Figure 9:
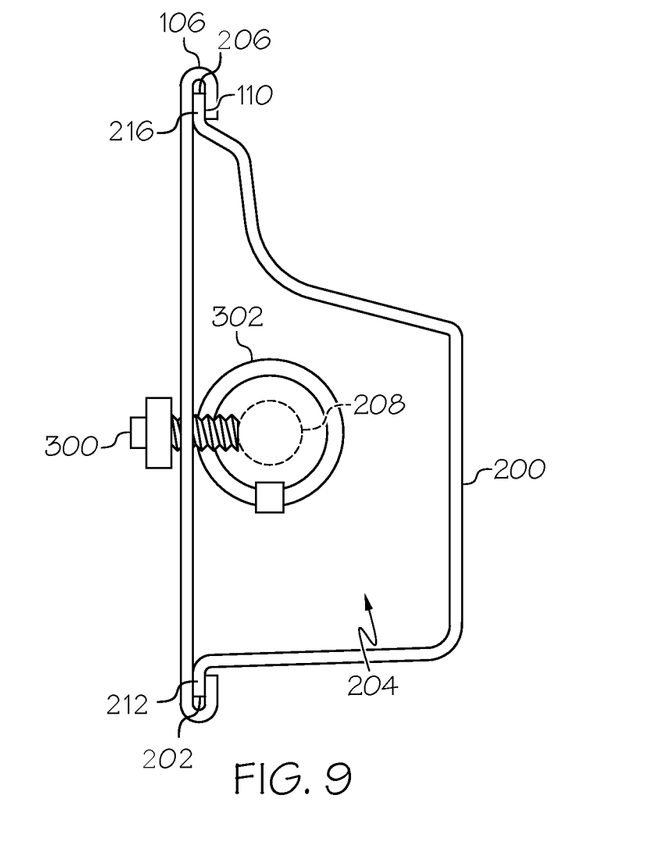
FIG. 9 schematically depicts a wire loom support affixed on a crossmember and a wire loom secured within a C-channel of a crossmember with a fastener and an anchor, according to one or more embodiments shown and described in this disclosure.

FIG. 2 illustrates that the body 102 of the wire loom support 100 further includes one or more anchor points 112 disposed between the hooked end 104 and the crimping end 106. The one or more anchor points 112 may take the form of a hole that is configured to receive an anchor 300, which provides an interface at which a fastener 302 (e.g., a zip tie) is secured to the wire loom support 100. The location of the one or more anchor points 112 may be disposed at a location that is preferable to support a wire loom 208 (FIGS. 7 and 9). The wire loom support 100 may be formed from a heat-resistant material, such as metal. The anchor 300 and a fastener 302 are described in further detail below, with reference to FIG. 9.

Figure 3:
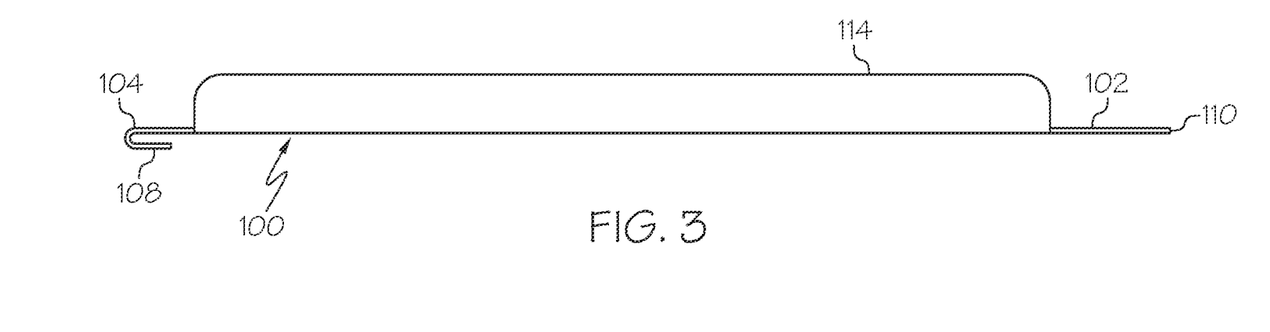
FIG. 3 schematically depicts a side view of a wire loom support, according to one or more embodiments shown and described in this disclosure.
Figure 4:
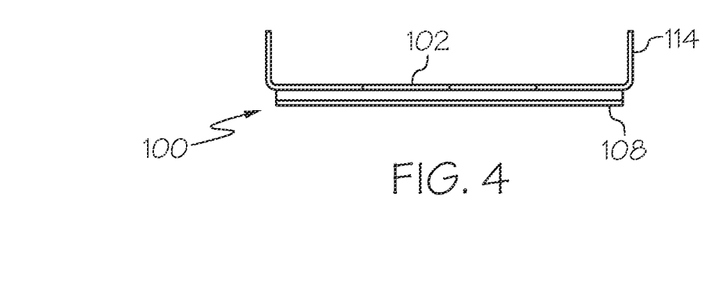
FIG. 4 schematically depicts a front view of a wire loom support, according to one or more embodiments shown and described in this disclosure.

FIGS. 3 and 4 illustrate details of the hook 108 and one or more flanges 114. To help with locating the wire loom support 100 during installation, the body 102 of the wire loom support 100 may further include the one or more flanges 114 spanning between the hooked end 104 and the crimping end 106. The one or more flanges may be bent in a direction opposite to a bending direction of the hook 108. For example, the flanges are shown as extending upwardly in FIGS. 3 and 4 and the hook bends downwardly. As will be clear to those of skill in the art, the wire loom support 100 may be oriented differently than shown in FIGS. 3 and 4, and may be used with the flanges extending downwardly when installed on the chassis crossmember.

Figure 5:
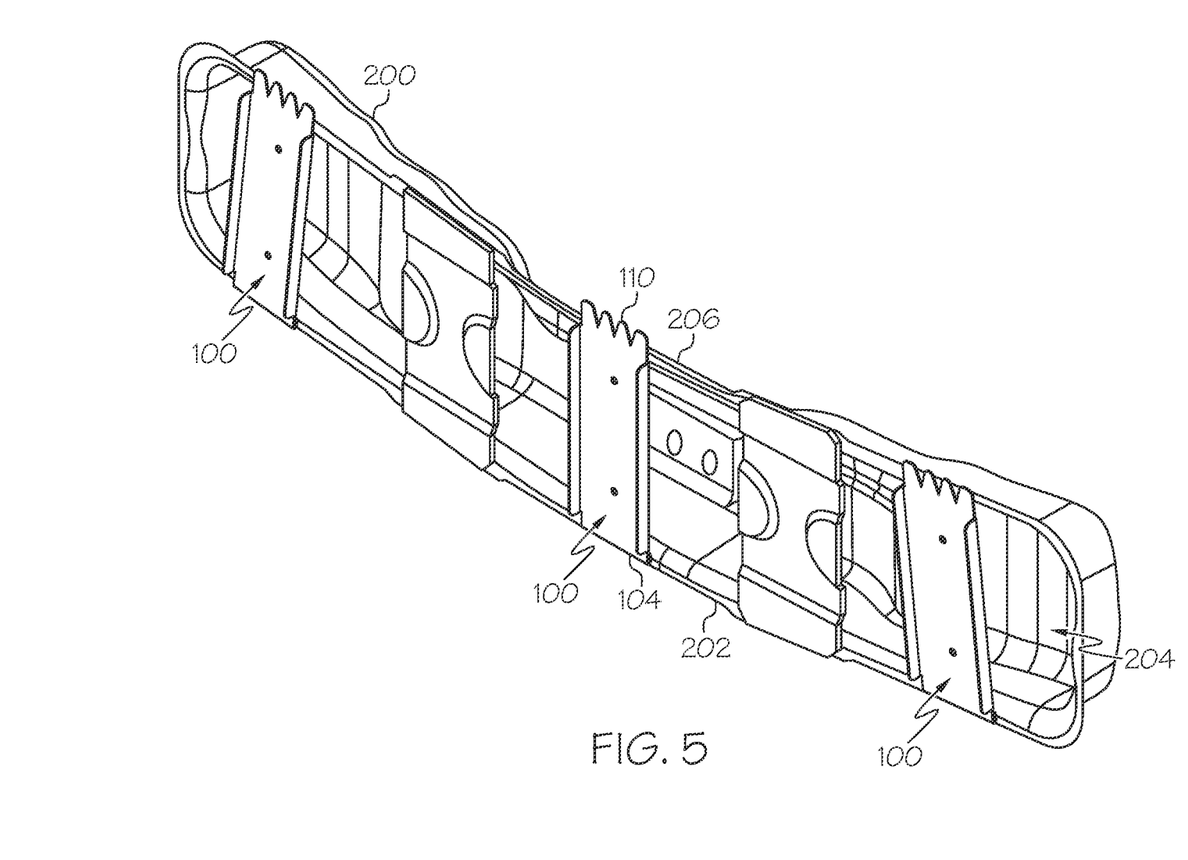
FIG. 5 schematically depicts wire loom supports placed on a crossmember, according to one or more embodiments shown and described in this disclosure.
Figure 10:
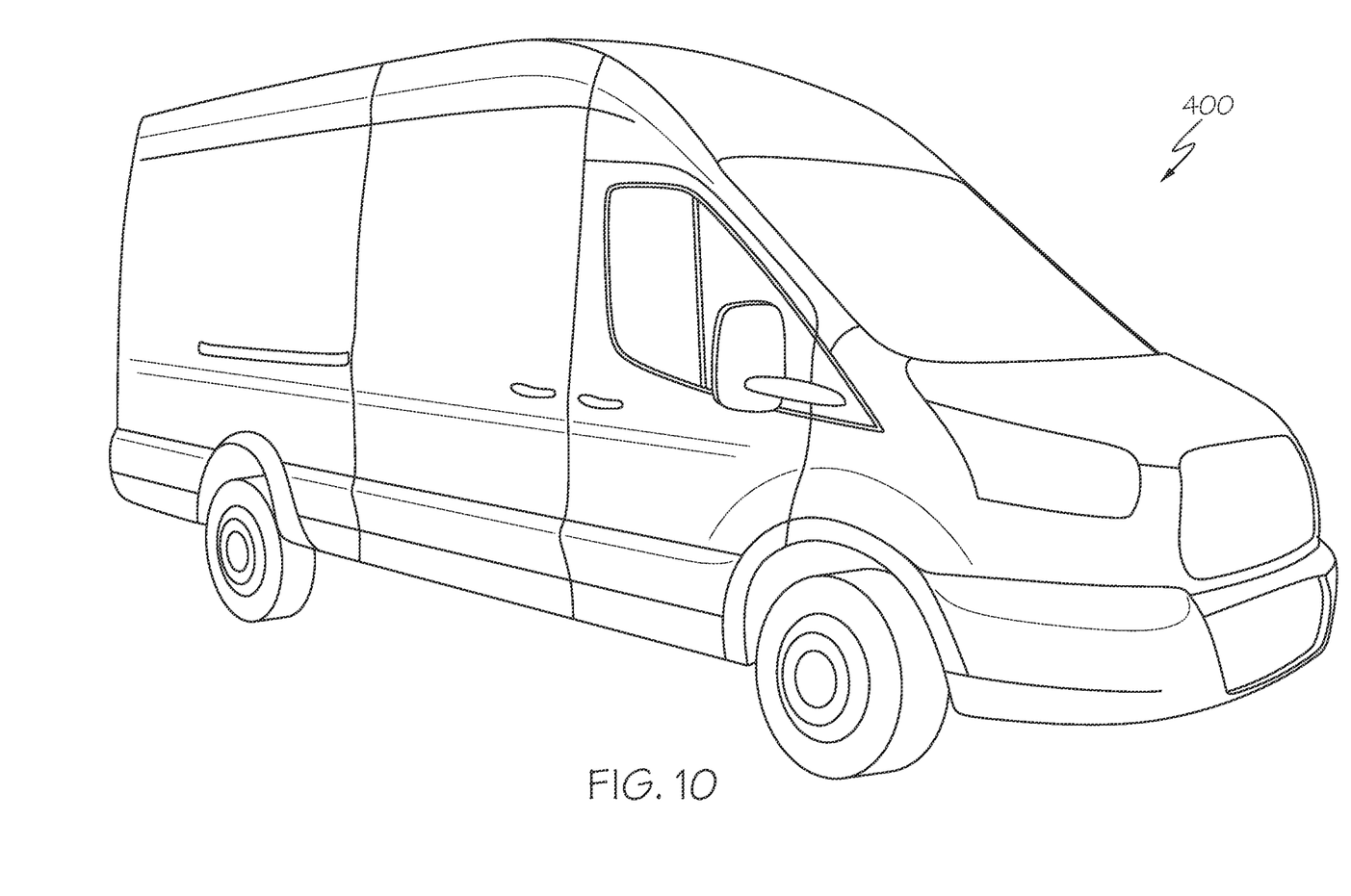
FIG. 10 schematically depicts a recreational vehicle, according to one or more embodiments shown and described in this disclosure.

Referring to FIG. 5, multiple wire loom supports 100 may be spaced along the crossmember 200 in order to support a wire loom 208 across the width of a vehicle 400 (e.g., a recreational vehicle, FIG. 10). The hooked end 104 of the wire loom support 100 is affixed to the first edge 202 of the crossmember 200 by ensuring that the hook 108 is properly dimensioned to be snugly fit over the first edge 202 of the crossmember, and by forcibly urging the hooked end 104 over the first edge 202 of the crossmember. This urging may be done by hand or with the aid of a tool, e.g., by tapping with a hammer. A C-channel 204 (e.g., a channel) is thereby partially covered with the wire loom supports 100 disposed along the crossmember 200.

Figure 6:
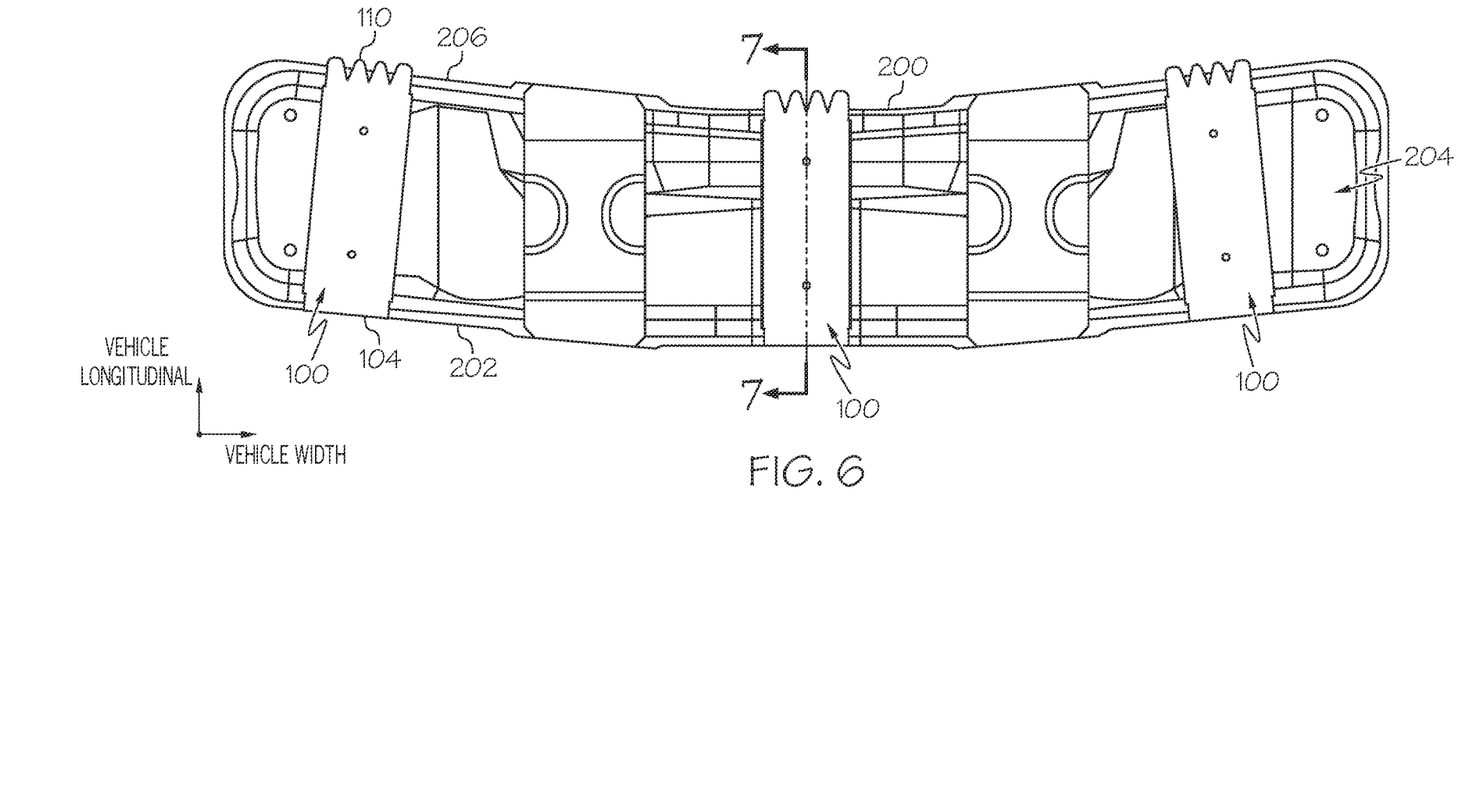
FIG. 6 schematically depicts wire loom supports placed on a crossmember viewed from a bottom of a vehicle, according to one or more embodiments shown and described in this disclosure.

FIG. 6. illustrates the wire loom supports 100 and the crossmember 200 viewed from a bottom of the vehicle 400. The wire loom supports 100 may maintain relative position to the crossmember 200 along the crossmember 200 by the hooked end 104 being affixed to the first edge 202 of the crossmember 200.

Figure 8:
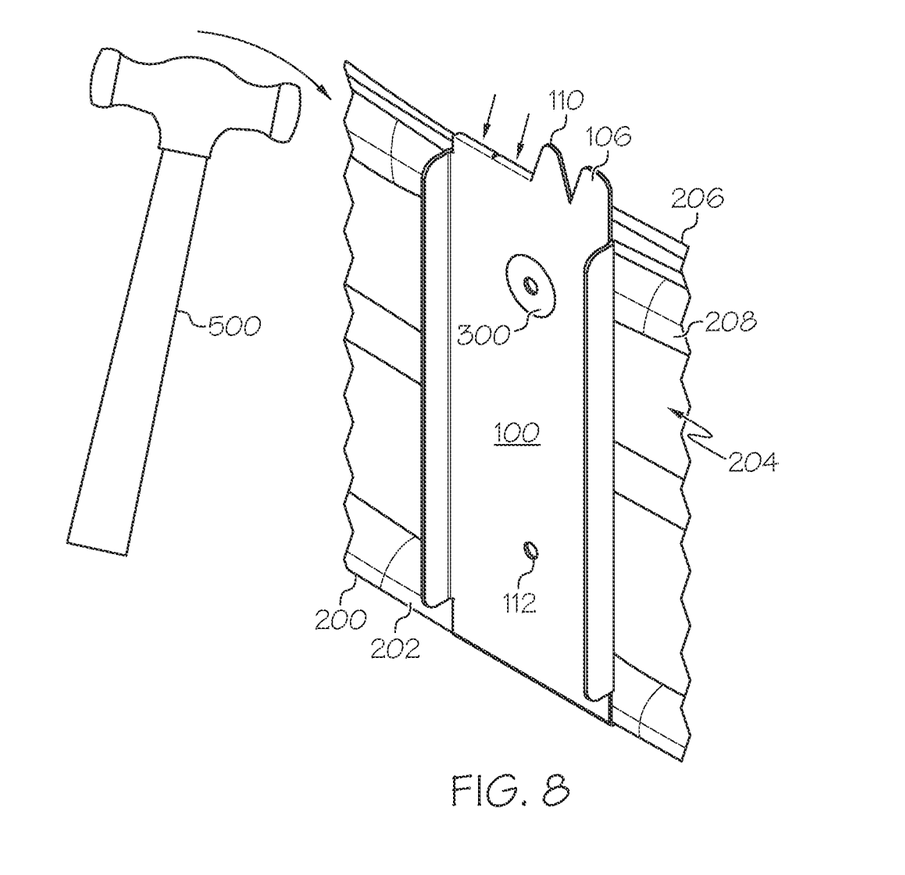
FIG. 8 schematically depicts a process of affix a wire loom support on a crossmember, according to one or more embodiments shown and described in this disclosure.

FIG. 7, which shows a cross section 7-7 of FIG. 6, shows the wire loom support 100 spanning the C-channel 204 of the crossmember 200 before the crimping end 106, including the one or more fingers 110, is folded over a second edge 206 as illustrated in FIG. 8. A wire loom 208 is placed in a space in the C-channel between the wire loom support 100 and the crossmember 200, typically before positioning the wire loop support 100, though the wire loom may also be placed in the C-channel after some or all of the wire loom supports are positioned.

Referring to FIG. 8, the one or more fingers 110 of the wire loom support 100 are then folded over the second edge 206 of the crossmember 200 in order to secure the wire loom support 100 to the crossmember 200. For example, and not by way of limitation, the one or more fingers 110 of the wire loom support 100 may be folded over the second edge 206 by repeatedly tapping each of the fingers 110 with a hammer to bias the one or more fingers 110 toward the second edge 206. The one or more fingers 110 may also be folded over the second edge 206 by applying force with a pressure-generating device, e.g., a vice, a clamp, a crimping tool or pliers. After one or more of the fingers 110 are folded over the second edge 206, the fingers 110 may form a second hook with a generally U-shaped cross-sectional shape similar to the hooked end 104. Alternatively, the crimping end may take other shapes to conform to the second edge 206 of the crossmember. The wire loom support 100 is then positioned to span the C-channel 204, such that the hooked end 104 of the wire loom support 100 contacts the first edge 202 of the crossmember, and the crimping end 106 of the wire loom support 100 contacts the second edge 206 of the crossmember 200.

Referring to FIG. 9, the wire loom 208 is threaded toward the C-channel 204 of the crossmember 200. The wire loom 208 may be threaded into the C-channel 204 of the crossmember 200 before or after both the hooked end 104 and the crimping end 106 are secured to the crossmember 200. Further, the wire loom 208 may be affixed to the wire loom support 100 by the fastener 302 and the anchor 300 before or after the wire loom support 100 is secured to the crossmember 200. The anchor 300 may be inserted through the anchor point 112 before or after the fastener 302 is attached to the wire loom 208. The anchor 300 may be a threaded fastening member, such as a bolt, a screw, and the like. The order of installation process is not limited to the above examples and may be modified for easy operation.

FIG. 10 illustrates one example of a recreational vehicle 400. As used in the present disclosure, a "recreational vehicle" may refer to any motor vehicle or trailer which includes living quarters (e.g., a living space) designed for accommodation. Types of recreational vehicles may include, but are not limited to, motorhomes, campervans, caravans (also known as travel trailers and camper trailers), fifth-wheel trailers, gooseneck trailers, popup campers, and truck campers. Recreational vehicles may also include toy haulers or car haulers. Recreational vehicles of the present disclosure may include in-frame or above-frame slide systems.

Figure 11:
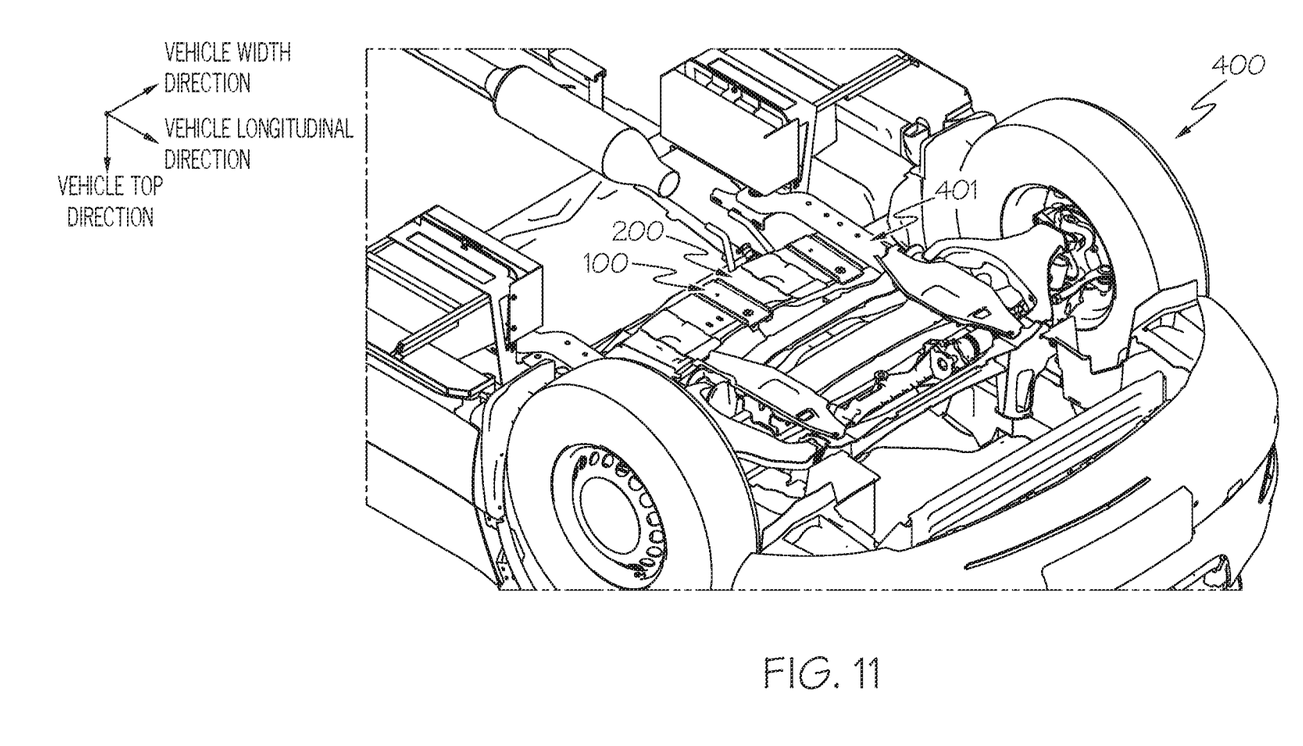
FIG. 11 schematically depicts a chassis of a recreational vehicle, according to one or more embodiments shown and described in this disclosure.

FIG. 11 schematically depicts the recreational vehicle 400 including a powertrain and a chassis 401 having a crossmember 200 and wire loom support 100 viewed from the underside of the recreational vehicle 400, according to one or more embodiments shown and described in this disclosure. Referring to FIG. 11, the chassis 401 of the recreational vehicle 400 may support one or more crossmembers 200. The wire loom support 100 may be disposed underneath the recreational vehicle 400, more specifically on an underside of each of the crossmembers 200. The location of the crossmembers 200 is not limited to the above examples and may be modified for better structural integrity of the chassis 401.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

As will be clear to those of skill in the art, the above embodiments may be altered in various ways without departing from the scope of the present disclosure. Each of the following is a non-limiting example. In any place where a C-channel is used, it could alternatively be a structural channel, a U-channel, or any other way of having a space for a wire loom.

One or more aspects of the present disclosure are described herein. A first aspect of the present disclosure may include a recreational vehicle. The recreational vehicle may comprise a vehicle body having a living space defined therein, a chassis supporting the vehicle body and having a crossmember disposed across the vehicle body, a wire loom, and a wire loom support. The wire loom support may comprise a body having a hook that fits over a first edge of the crossmember and a finger that folds over a second edge of the crossmember to support the wire loom between the wire loom support and the crossmember.

A second aspect of the present disclosure may include the first aspect, wherein the second edge may be disposed opposite the first edge in a crosswise direction of the chassis crossmember.

A third aspect of the present disclosure may include the second aspect, wherein the wire loom support may further comprise a flange on a side edge of the wire loom support.

A fourth aspect of the present disclosure may include the third aspect, wherein the flange may be bent in an opposite direction to a bending direction of the hook.

A fifth aspect of the present disclosure may include any one of the first through fourth aspects, wherein the finger may include a plurality of fingers.

A sixth aspect of the present disclosure may include any one of the first through fifth aspects, wherein the hook may extend along the first edge.

A seventh aspect of the present disclosure may include any one of the first through sixth aspects, wherein the wire loom support may have an anchor point in the body.

An eighth aspect of the present disclosure may include the seventh aspect, wherein the wire loom support may further comprise an anchor inserted through the anchor point.

A ninth aspect of the present disclosure may include the eighth aspect, wherein the wire loom support may further comprise a fastener attached to the anchor. The fastener may fasten the wire loom to the wire loom support.

A tenth aspect of the present disclosure may include any one of the first through ninth aspects, wherein the crossmember may have an underside with a channel. The wire loom body may be disposed in the channel.

An eleventh aspect of the present disclosure may include any one of the first through tenth aspects, wherein the crossmember may have an outwardly extending flange 212 (FIG. 9) on the first edge 202 (FIG. 9).

A twelfth aspect of the present disclosure may include the eleventh aspect, wherein the hook may fit onto the flange of the first edge.

A thirteenth aspect of the present disclosure may include any one of the first through twelfth aspects, wherein the crossmember may have an outwardly extending flange 216 (FIG. 9) on the second edge 206 (FIG. 9).

A fourteenth aspect of the present disclosure may include the thirteenth aspect, wherein the finger may fold onto the flange of the second edge.

A fifteenth aspect of the present disclosure may include any one of the first through fourteenth aspects, further comprising a powertrain. The chassis may support the powertrain.

A sixteenth aspect of the present disclosure may include any one of the first through fifteenth aspects, wherein the wire loom support may include a plurality of wire loom supports disposed along the crossmember.

A seventeenth aspect of the present disclosure may include any one of the first through sixteenth aspects, wherein the body of the wire loom support may have the hook at one end and the finger at the other end.

An eighteenth aspect of the present disclosure may include a method of supporting a wire loom of a recreational vehicle having a living space defined therein. The method may comprise disposing a body of a wire loom support adjacent a crossmember that is disposed across an underside of a vehicle body of the recreational vehicle, hooking a hook of the wire loom support to a first edge of the crossmember with the wire loom body disposed between the wire loom support and the crossmember, placing a finger of a wire loom support over a second edge of the crossmember, and applying a force on the finger to bend the finger over the second edge, thereby securing the wire loom support to the crossmember and supporting the wire loom between the wire loom support and the crossmember.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A recreational vehicle comprising a vehicle body having a living space defined therein, a chassis supporting the vehicle body and having a crossmember disposed across the vehicle body, a wire loom, and a wire loom support wherein:

the wire loom support comprises a wire loom support body having a hook that fits over a first edge of the crossmember and a finger that folds over a second edge of the crossmember to support the wire loom between the wire loom support and the crossmember, and the wire loom support body terminates at the first edge and at the second edge.

2. The recreational vehicle according to claim 1, wherein the second edge is disposed opposite the first edge in a crosswise direction of the crossmember.

3. The recreational vehicle according to claim 1, wherein the wire loom support further comprising a flange on a side edge of the wire loom support.

4. The recreational vehicle according to claim 3, wherein the flange is bent in an opposite direction to a bending direction of the hook.

5. The recreational vehicle according to claim 1, wherein the finger includes a plurality of fingers.

6. The recreational vehicle according to claim 1, wherein the hook extends along the first edge.

7. The recreational vehicle according to claim 1, wherein the wire loom support has an anchor point in the wire loom support body.

8. The recreational vehicle according to claim 7, wherein the wire loom support further comprises an anchor inserted through the anchor point.

9. The recreational vehicle according to claim 8, wherein the wire loom support further comprises a fastener attached to the anchor, the fastener fastens the wire loom to the wire loom support.

10. The recreational vehicle according to claim 1, wherein the crossmember has an underside with a channel, the wire loom being disposed in the channel.

11. The recreational vehicle according to claim 1, wherein the crossmember has an outwardly extending flange on the first edge.

12. The recreational vehicle according to 11, wherein the hook fits onto the flange of the first edge.

13. The recreational vehicle according to claim 1, wherein the crossmember has an outwardly extending flange on the second edge.

14. The recreational vehicle according to 13, wherein the finger folds onto the flange of the second edge.

15. The recreational vehicle according to claim 1, further comprising a powertrain, wherein the chassis supports the powertrain.

16. The recreational vehicle according to claim 1, wherein the wire loom support includes a plurality of wire loom supports disposed along the crossmember.

17. The recreational vehicle according to claim 1, wherein the wire loom support body of the wire loom support has the hook at one end and the finger at the other end.

18. The recreational vehicle according to claim 1, wherein the crossmember defines a channel, and the wire loom is disposed in the channel between the wire loom support and the crossmember when the wire loom support is placed over the crossmember.

19. A method of supporting a wire loom of a recreational vehicle having a living space defined therein, the method comprising:

disposing a wire loom support body of a wire loom support adjacent a crossmember that is disposed across an underside of a vehicle body of the recreational vehicle;

hooking a hook of the wire loom support to a first edge of the crossmember with the wire loom disposed between the wire loom support and the crossmember;

placing a finger of the wire loom support over a second edge of the crossmember; and applying a force on the finger to bend the finger over the second edge, thereby securing the wire loom support to the crossmember and supporting the wire loom between the wire loom support and the crossmember.

* * * * *